June 28, 1955  C. FULSTER  2,711,608
DECOY
Filed Oct. 4, 1954
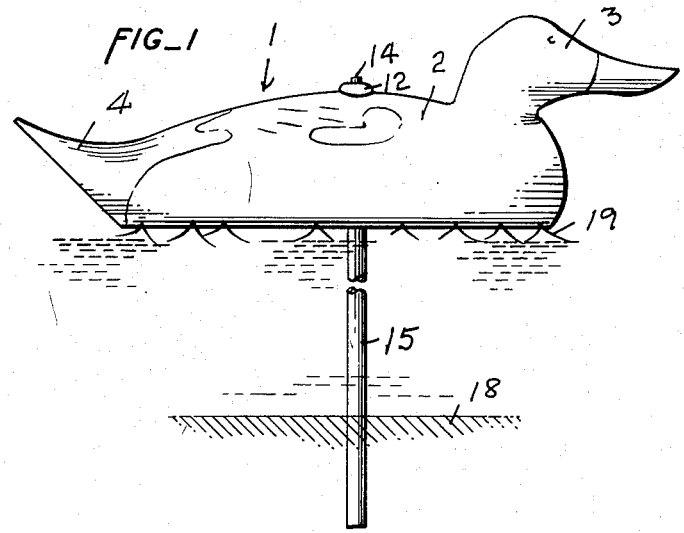
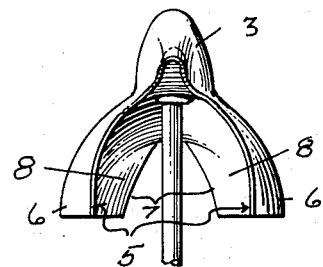
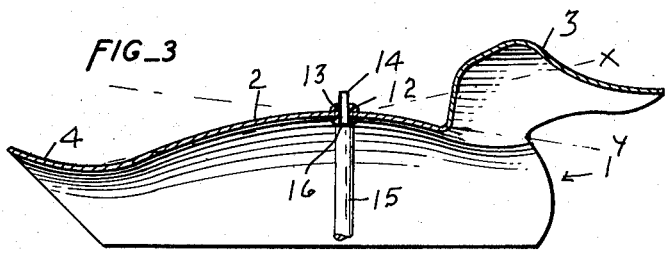
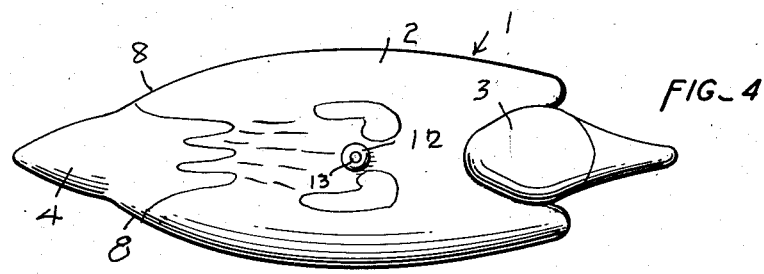
INVENTOR.
CHRIS FULSTER
BY
ATTORNEYS

United States Patent Office 2,711,608
Patented June 28, 1955

2,711,608

DECOY

Chris Fulster, Sacramento, Calif.

Application October 4, 1954, Serial No. 460,043

3 Claims. (Cl. 43—3)

This invention relates to a decoy for ducks and has for one of its objects the provision of a simple, economically made and highly effective decoy that is adapted to be securely supported in a pond, and when so supported will simulate the natural movement of a duck on the water and can be left in place for the season, if desired, without becoming waterlogged or losing its effectiveness.

Another object of the invention is the provision of decoys for ducks that are relatively light in weight and that can be nested for transporting or storing them, thus occupying only a fraction of the space that is required by conventional decoys.

A still further object of the invention is the method of establishing a decoy on a pond so that the decoy is not floating in the water but will still rock and rotate under the influence of the waves and wind, and in a natural manner.

Other objects and advantages will appear in the description and in the drawings.

In the drawings,

Fig. 1 is a side elevational view of a decoy in position supported over the water in a pond above the mean level of the surface of said water but within reach of the crests of the waves.

Fig. 2 is a front elevational view of the decoy of Fig. 1.

Fig. 3 is a vertical sectional view taken centrally through the decoy longitudinally of the latter.

Fig. 4 is a top plan view of the decoy.

In detail, the decoy 1 as illustrated includes a body 2, head 3 including a beak, and tail 4 in their normal relationship. The body, head and tail being preferably integrally united and they may be stamped from a single sheet of material, as illustrated, or it could be fabricated from several pieces that may then be secured together. However, the design is such that the decoy may be entirely stamped from a single sheet of metal without involving more than a single stamping operation with a simple die, and the decoys can then be sprayed or painted to provide the desired appearance.

When formed, the body, head, and tail of the decoy have an upper side and opposite lateral sides, and the forward side of the head is closed from the beak upwards, so that the appearance of the decoy from the top and from either side, is natural. Since the front side below the beak and the underside of the tail are not noticeable and normally are dark and not seen, there is no necessity for them being closed, and by leaving them open, a through channel for air is provided with the space 5 between the sides 6 at the forward end of the body (Fig. 2) being substantially wider than the space 7 at the tail end of the decoy.

The sides extend convergently toward each other from approximately the center of the body 2 to the rear opening or space 7, as indicated at 8 (Figs. 2, 4).

At approximately the point of balance of the decoy between its head and tail ends, the back of the body 2 is formed with a vertical opening that may have a rubber or relatively soft plastic grommet 12 secured therein. The central opening 13 in the grommet provides an opening in the back of the decoy into which the upper reduced diameter end portion 14 (Fig. 1) of a stake 15 is adapted to loosely extend with the upwardly facing shoulder 16 on the stake in engagement with the underside of the grommet 12 (Fig. 3).

The decoy will thus be supported at its upper portion for universal movement about the point in which the opening 13 is disposed. That is to say that it will rock in any direction about said point as well as rotate in a horizontal plane thereabout. The rocking of the decoy, up and down about a horizotnal axis that is normal to the longitudinal axis of the decoy, as indicated by dot-dash lines X, 4 (Fig. 3), is the most important rocking movement.

The fact that the sides of the body extend convergently rearwardly at 8 insures the decoy heading or quartering into the wind instead of being broadside, and instead of the tail heading into the wind. Inasmuch as live ducks normally head or quarter into the wind, it is essential that a decoy do the same.

The method of establishing the decoys, as above described, in a pond is to firmly imbed the lower ends of the stakes 15 into the bed 18 (Fig. 1) of the pond so that the upper end projects above the level of the water a sufficient distance to support the decoys spaced above the mean level of the water but within reach of such waves 19 as occur when the wind is blowing. Since the waves or ripples normally run before the wind, it is seen that the engagement between the waves and the lower edges of the sides of the decoy will cause the decoy to rock about a horizontal axis extending through the opening 13 and substantially normal to the longitudinal axis of the decoy. This rocking movement is gentle and natural, since the resistance offered to the waves by the edges of the sides of the decoy is small. If the waves should be relatively large, the fact that only the edges of the decoys are permitted to engage the waves is of importance. Otherwise the decoy might be dislodged or injured.

When there is little or no wind and the surface of the pond is quiet, the decoys will also be quiet and will give the appearance of floating on the water when viewed from any angle of approach by live ducks.

In transporting a load of decoys or in storing them, they may be nested one within the other so that many of them will take up little more room than a single conventional decoy.

I claim:

1. A decoy comprising a hollow shell open on its underside and formed with a head including a beak, back, opposite sides and a tail to simulate the appearance of a duck when viewed from the top and sides, the front and rear ends of said shell being open from the outer edge of the beak to the outer edge of the tail to provide a through horizontal passage for air between said sides whereby said shell will be turned by the wind to simulate the normal movement of a duck when said shell is supported for swinging about a vertical axis, said sides being convergent in a horizontal direction away from said head and adjacent to said tail for causing the head end of the body to swing generally into the wind when such wind passes through said passage.

2. A decoy comprising: a hollow shell of sheet material simulating a duck's body and including a head and beak, tail, and spaced opposed lateral sides; said shell being open on its underside and at its head and tail ends to provide a downwardly opening elongated open ended passageway for air extending from the terminating outer ends of said beak and tail and open at said terminating outer ends, means for supporting said shell substantially at the point of balance along said back for rotation of said shell about a vertical axis at said point and for rocking of said shell about any horizontal axis extending through said point, the space between said opposed sides at the forward end of said body and at said head being greater than the space between said sides at the tail end of said body and said forward end of said body being open and below said head and beak to admit horizontally moving wind into said passageway at said forward end of said body and into the said head at the said outer end of said beak to cause said body to rotate to head into such wind.

3. A decoy comprising: a hollow shell of sheet metal simulating a duck's body and including a back, a head and beak, tail and spaced opposed lateral sides, said body being open on its underside and at its head and beak and tail ends to provide a downwardly opening, elongated, open ended passageway for air extending from the beak of said head to said tail end, said head projecting a substantial distance above the level of said back and the said lateral sides at the forward open end of said body being spaced apart a substantially greater distance than the spacing between said lateral sides at the open tail end of said shell whereby said body will head into a horizontally moving wind upon being supported for rotation, about a vertical axis, said back having an opening therein substantially at the point of balance of said shell, a grommet having a central circular aperture therein secured in said opening to provide a bearing having radially inwardly and an axially downwardly directed bearing surface, a vertical stake having its upper end loosely extending through said aperture and provided with an axially upwardly directed bearing surface engaging the said downwardly directed bearing surface on said grommet supporting said grommet and shell for free rotation of said shell about the axis of said stake and for free rocking of said grommet and shell about any horizontal point of balance extending through said axis at said grommet, said grommet being of relatively soft, elastic, waterproof material resistant to weather and corrosion whereby said rocking and rotation of said shell will be substantially noiseless and free from binding on said stake.

References Cited in the file of this patent

UNITED STATES PATENTS

| | | |
|---|---|---|
| 364,573 | Brinkop | June 7, 1887 |
| 957,750 | Cunningham | May 10, 1910 |
| 1,508,717 | Page | Sept. 16, 1924 |
| 1,833,002 | Smith | Nov. 24, 1931 |
| 1,892,943 | Geyer | Jan. 3, 1933 |
| 2,354,581 | DeJong | July 25, 1944 |
| 2,441,753 | Carpenter | May 18, 1948 |
| 2,617,298 | Grinley | Nov. 11, 1952 |

FOREIGN PATENTS

| | | |
|---|---|---|
| 389,522 | Great Britain | 1933 |
| 500,732 | Great Britain | 1939 |
| 611,844 | Great Britain | 1948 |